(No Model.) 4 Sheets—Sheet 1.
J. C. CROMWELL & O. SUNDT.
MACHINE FOR MAKING SPIKES.
No. 577,680. Patented Feb. 23, 1897.
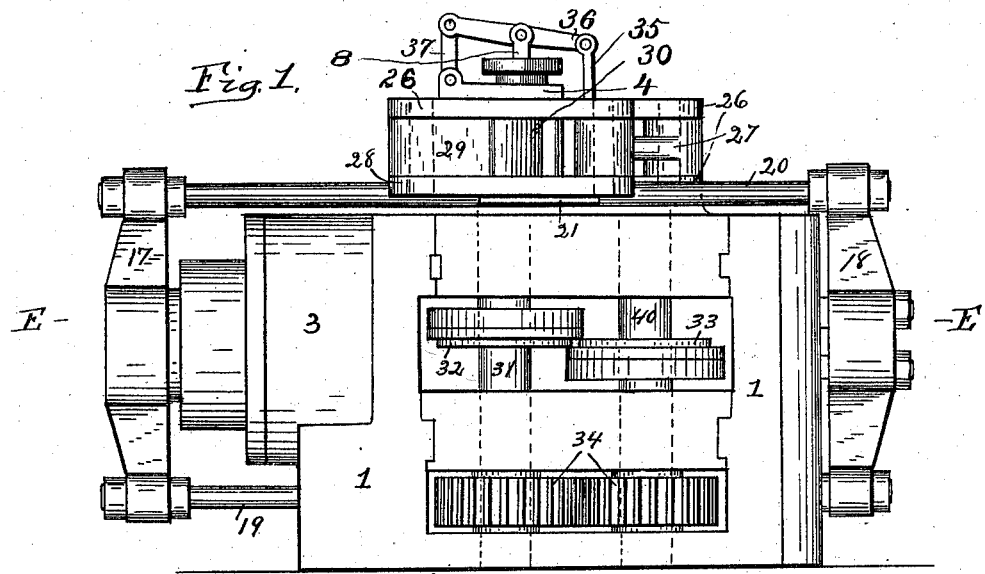
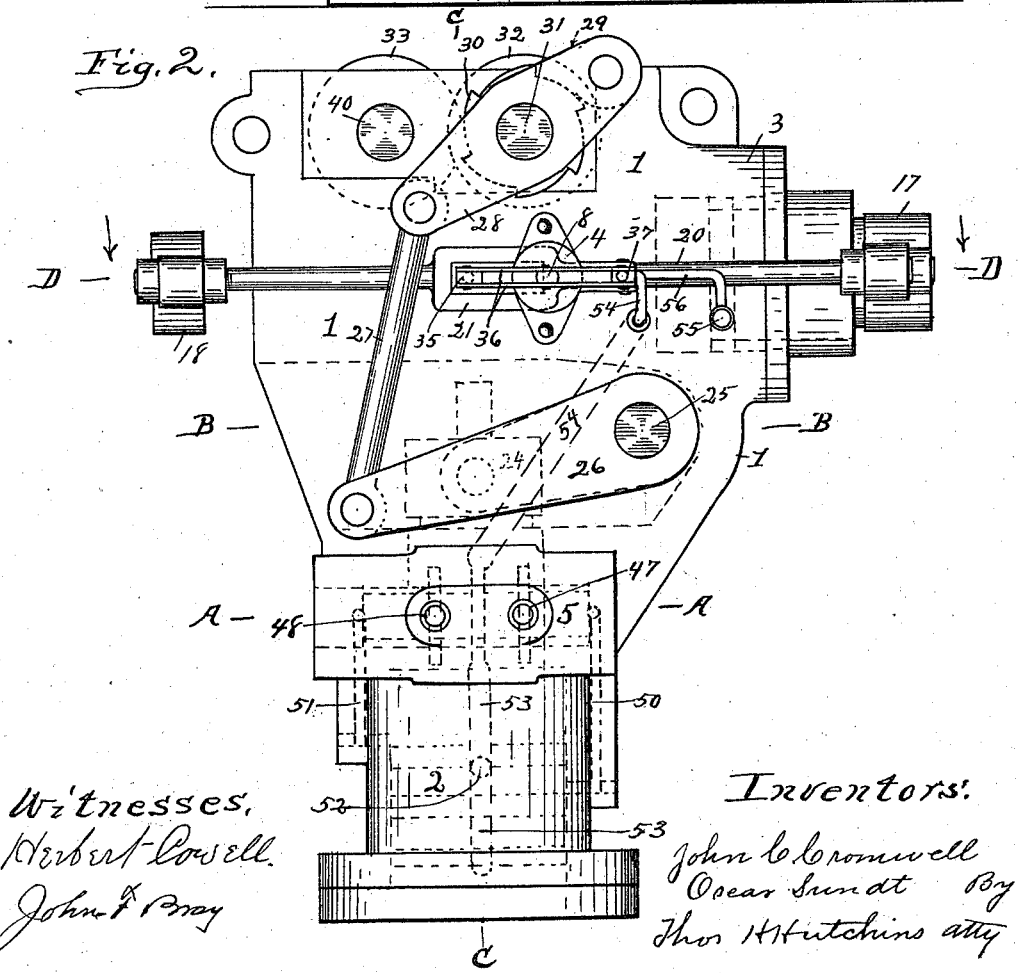
Witnesses,
Herbert Powell
John F Bray
Inventors:
John C Cromwell
Oscar Sundt By
Thos H Hutchins atty

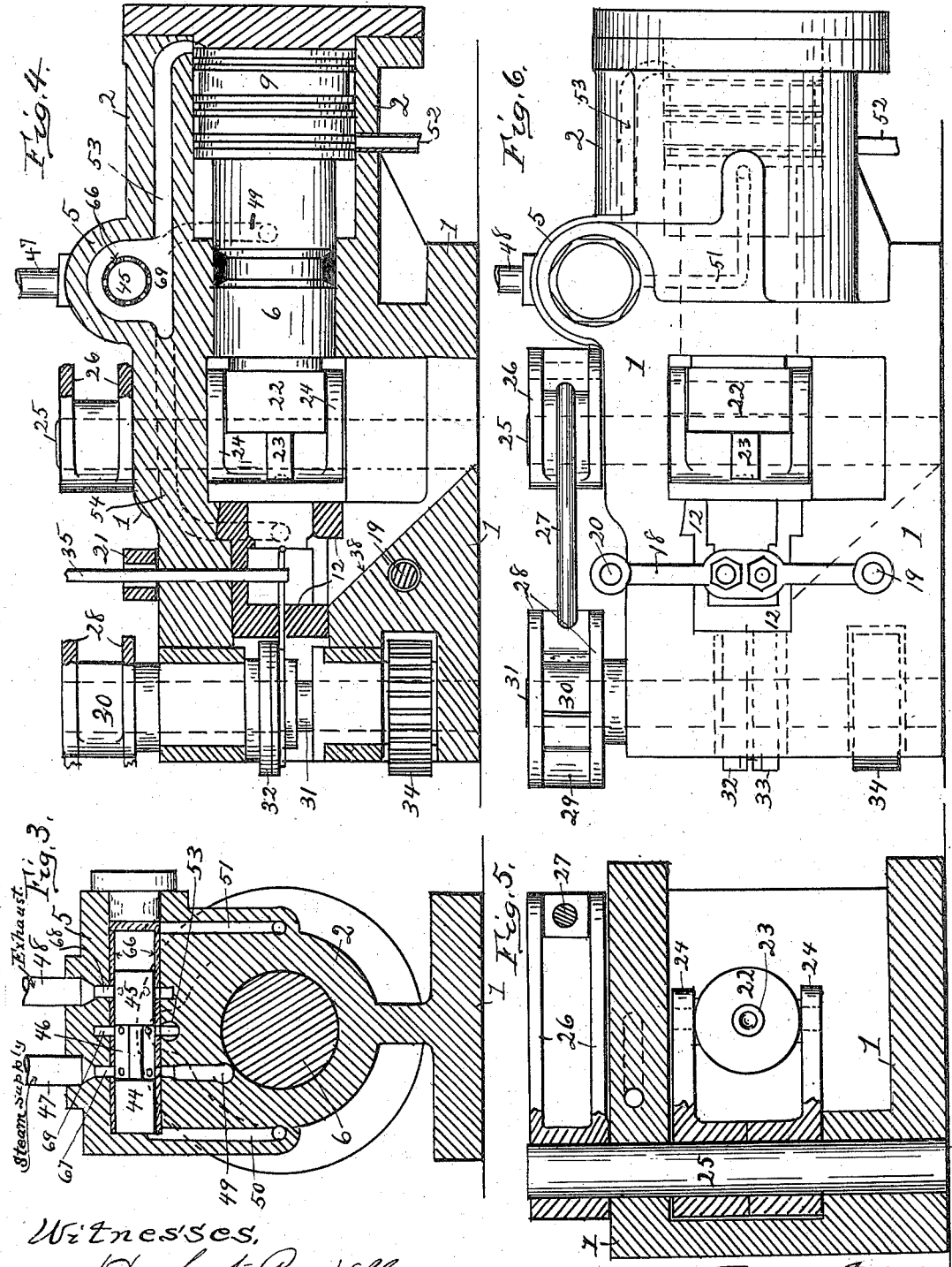

(No Model.) 4 Sheets—Sheet 3.
J. C. CROMWELL & O. SUNDT.
MACHINE FOR MAKING SPIKES.
No. 577,680. Patented Feb. 23, 1897.
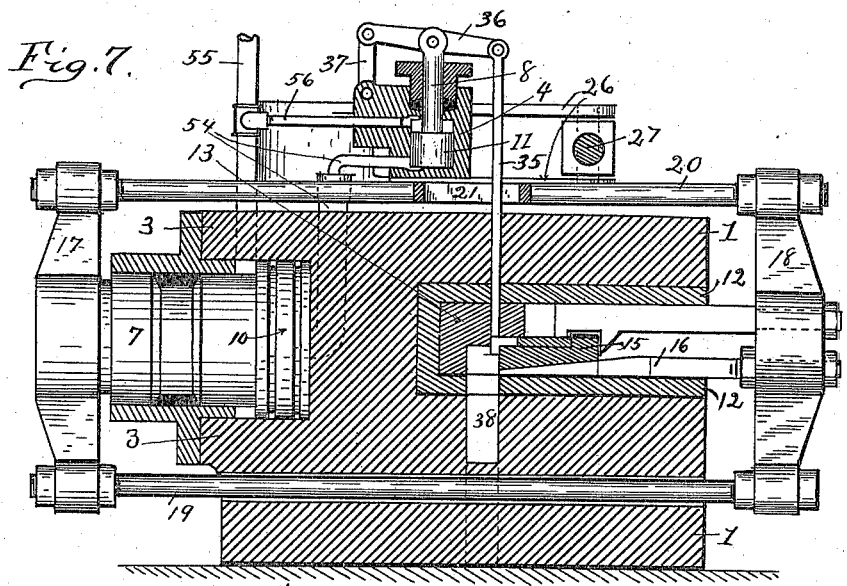
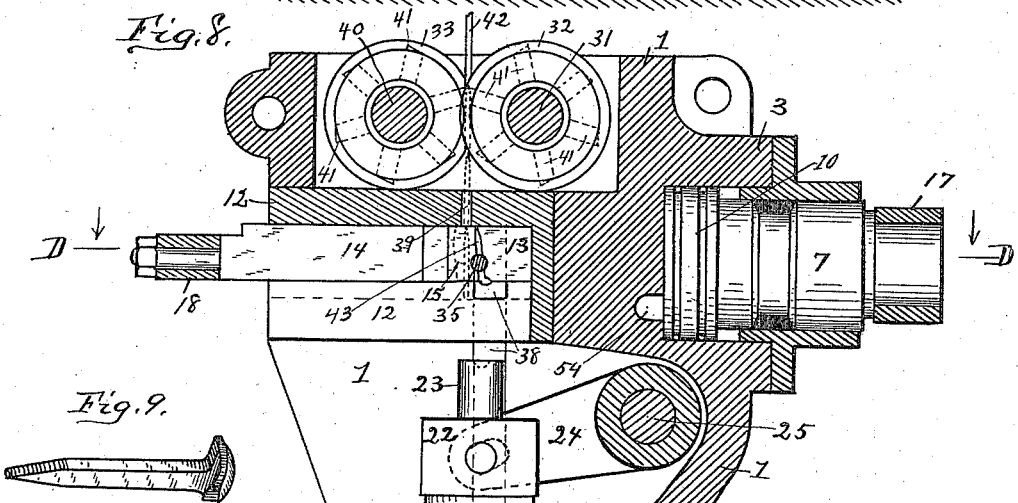
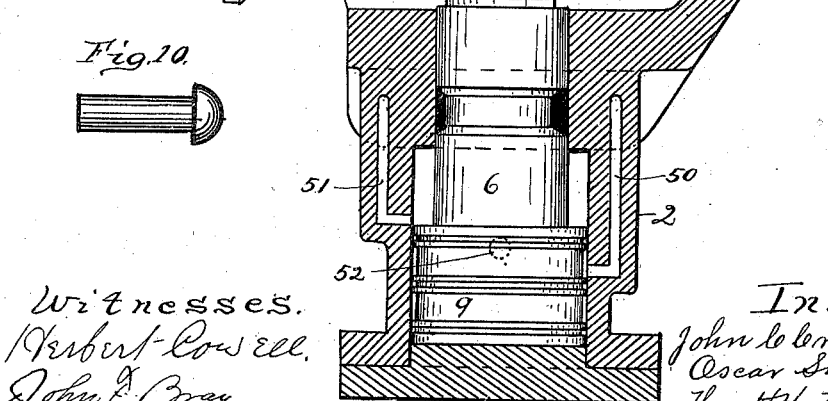
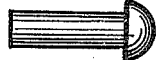
Witnesses.
Herbert Cowell.
John F. Bray
Inventors.
John C. Cromwell
Oscar Sundt By
Thos H Hutchins atty
THE NORRIS PETERS CO., PHOTO-LITHO., WASHINGTON, D. C.

(No Model.) 4 Sheets—Sheet 4.

J. C. CROMWELL & O. SUNDT.
MACHINE FOR MAKING SPIKES.

No. 577,680. Patented Feb. 23, 1897.

Witnesses.
Herbert Cowell
John F. Bray

Inventors.
John C. Cromwell
Oscar Sundt By
Thos H Hutchins atty

THE NORRIS PETERS CO., PHOTO-LITHO., WASHINGTON, D. C.

UNITED STATES PATENT OFFICE.

JOHN C. CROMWELL AND OSCAR SUNDT, OF JOLIET, ILLINOIS; SAID SUNDT ASSIGNOR TO SAID CROMWELL.

MACHINE FOR MAKING SPIKES.

SPECIFICATION forming part of Letters Patent No. 577,680, dated February 23, 1897.

Application filed May 15, 1896. Serial No. 591,697. (No model.)

*To all whom it may concern:*

Be it known that we, JOHN C. CROMWELL, a citizen of the United States of America, and OSCAR SUNDT, a subject of the King of Sweden and Norway, residing at Joliet, in the county of Will and State of Illinois, have invented certain new and useful Improvements in Machines for Making Spikes, of which the following is a specification, reference being had therein to the accompanying drawings and the figures of reference thereon, forming a part of this specification, in which—

Figure 11:
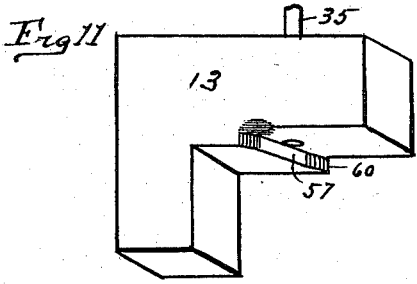
Figure 12:
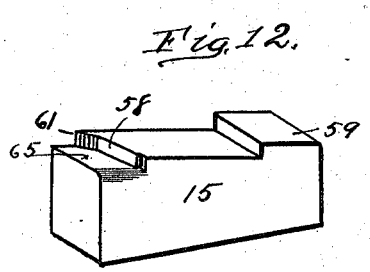
Figure 13:
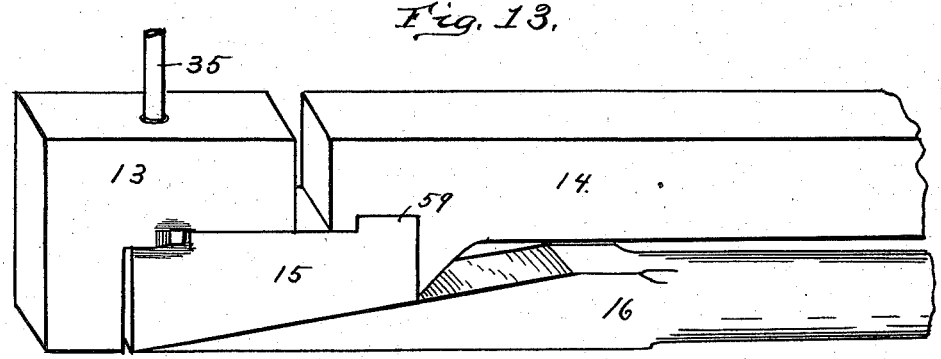
Figure 14:
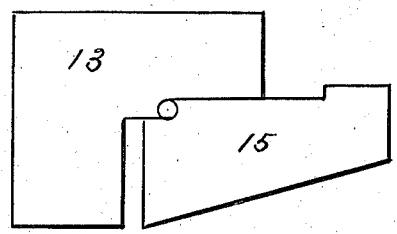
Figure 15:
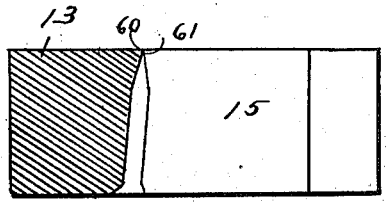
Figure 16:

Figure 1 is an end elevation of the machine, looking at Fig. 2 from the top of the sheet. Fig. 2 is a top plan of the machine. Fig. 3 is a vertical cross-section of Fig. 2, taken on line A A. Fig. 4 is a vertical longitudinal section of Fig. 2, taken on line C C. Fig. 5 is a vertical cross-section of Fig. 2, taken on line B B. Fig. 6 is a side elevation of the machine, looking at Fig. 2 from the left. Fig. 7 is a vertical cross-section of Figs. 2 and 8, taken on line D D, looking in the direction of the arrows. Fig. 8 is a longitudinal section of the machine, taken on line E E of Fig. 1. Figs. 9 and 10 are views of a railway-spike and of a structural rivet, the same being the product of the machine. Fig. 11 is a detail perspective view of the stationary spike-forming die. Fig. 12 is a perspective view of the movable or operating die. Fig. 13 is a perspective view of said two dies as they would appear when in position with relation to each other to operate upon a spike and also showing the parts for connecting and adjusting said dies. Fig. 14 is a face plan of said two dies brought to a registering position and showing hollowed gripping-faces. Fig. 15 is a horizontal section of said stationary die, taken on a line with its gripping-face, and a top plan of its operating fellow die, the same being brought to a registering position; and Fig. 16 is a detailed sectional view of the outer end of the heading-tool of the heading-ram of the machine.

This invention relates to certain improvements in machines for making railway-spikes, structural rivets, bolts, &c., of the class wherein the dies and parts operating upon the spike are actuated by steam-pistons; and it consists more particularly in the novel construction and arrangement of certain combined parts and in the mechanism by which the operative parts of the machine are actuated, which improvements are fully set forth and explained in the following specification and claims.

The object of this invention is to produce a machine of this class wherein the various movements are made and controlled by means of direct steam-pressure, whereby the most effective results and the greatest direct power are attained.

Referring to the drawings, the pedestal and frame of the machine consists of a heavy casting, (shown at 1,) which comprises in its construction two horizontally-arranged steam-cylinders 2 and 3, arranged at right angles to each other, and a steam-chest 5, located above said cylinder 2, and has attached to its upper part a third steam-cylinder 4, said cylinders being respectively provided with the steam-pistons 6, 7, and 8 and with piston-heads 9, 10, and 11. Frame 1 is provided with a recess extending from one side into the central portion thereof, in which recess is placed a die-box, as shown at 12, which has seated in its inner end portion a stationary die 13 and has operatively placed therein a fellow die 15, connected with an operating-bar 14, which extends out from said die-box. Said die 15 is seated upon the inclined face of an adjusting wedge-bar 16, which also extends out from said die-box. Bar 14 is firmly connected to a cross-head 18 of a horizontally-reciprocating frame, which comprises said cross-head 18, an opposite similar cross-head 17, and two parallel connecting rods or bars 19 and 20, the bar 19 passing through an aperture in said frame 1, and rod 20 operates across the top of said frame. The cross-head 17 is connected to piston 7 of cylinder 3, so that movement of said piston will reciprocate said frame, and thereby operate bars 14 and 16, and thus actuate die 15 to and from die 13. The rod 16 is connected to cross-head 18 in such manner as to have end adjustment therein for the purpose of holding die 15 connected to rod or bar 14. When wedge-bar is moved backward, it will cause the cross-rib 59 on the upper side of said die to become disconnected from a corresponding cross-channel on the under side of rod 14, so that said die can be removed and a new one replaced when necessary.

Piston 6 of cylinder 2 is provided with a head 22, into which is fixed a tool 23, adapted to engage and upset the metal from which spikes, rivets, &c., are made and form their heads, and said piston-head and tool taken together form what we term a "ram."

A vertically-arranged shaft 25 is boxed in a bore of frame 1. Said shaft has attached to it a double arm 24, having its outer ends connected to trunnions on piston-head 22, so that movement of said ram will oscillate said shaft through the medium of said arms and will likewise operate an arm 26, fixed to the upper end of said shaft.

31 and 40 are a pair of vertical parallel shafts boxed in suitable journal-bores of said frame 1, and have respectively secured thereon at about their center and in a recess in said frame a pair of flanged feed-rolls 32 and 33. Said shafts are each provided near their lower ends in a suitable recess in said frame with gear-wheels 34, which mesh with each other and cause said shafts to turn jointly, or in such manner that one shaft drives the other, so as to cause the feed wheels or rolls to feed the spike-bar into the machine. Shaft 31 has a ratchet-wheel 30 secured on its upper end, and has secured thereon an oscillating lever 28, carrying a spring-pawl 29, arranged to engage the teeth of said ratchet-wheel. Said lever is connected by means of a rod 27 with lever 26 on shaft 31, by means of which connection with the ram said feed-rolls 32 and 33 are intermittently rotated. Piston 8 of cylinder 4 connects at its upper end with a lever 36, which is fulcrumed to a link 37, pivoted to the frame of said cylinder, and which has pivotally connected to its working end a depending rod 35, which extends down through a yoke 21 of rod 20 and through a bore or hole through frame 1, die-box 12, and stationary die 13, which rod is termed a "shedder-tool," and is given a reciprocating motion by means of the actuation of piston 8 for the purpose of dislodging finished spikes, rivets, &c., from between the grip-die 13 and out of the way of the next succeeding spike and cause it to be discharged from the machine through a chute 38, formed in the machine-frame.

The rod or bar from which the spikes or rivets are to be made is represented in Fig. 8 at 42, and is intermittently fed into the machine by and between the feed-rolls 32 and 33, and said rolls are provided at their peripheries with radial meeting dies 41, formed, as represented in Fig. 8, so as to pinch the spike-rod at intervals equal to the length required for a spike and thus form a chisel-shaped point on the spike and nearly sever the rod at each pinch, and so the spike will hold onto the spike-bar so it can be moved forward to between the dies, and so that the feed wheels or rolls and their dies will form continuous blanks. At each actuation of the feed-rolls rod 42 will be fed forward into the machine the length required for one spike, delivering it through a hole 39 in die-box 12, under die 13, on a plane with its gripping-face 57, (see Figs. 8 and 11,) and bringing the severing-point of the blank to rest at the junction of the inner wall of die-box 12 and the rear side of the dies 13 and 15, so that the advancing movement of die 15 will bring its shearing edge 61 (see Fig. 12) to bear against the severing-point of the blank and shear it loose from the end of the spike-rod or next succeeding blank, and in so doing the gripping-face 58 of die 15 (see Fig. 12) will engage the side of the blank and force it hard against the gripping-face 57 of die 13, the blank being held from falling during such cutting and gripping period by means of resting upon the ledge 65 of die 15, and the pressure brought to bear against the blank thus gripped is sufficient to firmly hold it, so its end may be engaged and upset by the tool 23 of the ram and thus forced into shape proper to form the head, as shown in Fig. 9. Also such gripping-pressure is such as to compress the spike-point and shape and finish it to a proper chisel-edge, as also shown in said figure. In feeding in the spike-blanks between the gripping-dies they are fed in far enough so their ends project sufficiently beyond the dies to provide stock from which to upset and form their heads, and as a means for causing their heads to project to one side from the center line of the spike the gripping-faces of the dies 13 and 15 are arranged to be at a slight angle to the line of the movement of the ram, so the blanks when gripped will be held at such angle, and therefore the action of the ram-tool 23 against the blank end will cause it to be thrown to one side in the direction of the incline of the blank, (see Fig. 15,) and the peculiar shape given the spike-heads, as shown in Fig. 9, is attained. After a spike is formed and the die 15 recedes the shedder-rod 35 is actuated to quickly move downwardly through die 13 and engage and dislodge the spike from said die 13, causing it to fall, when not having done so by gravity, into the discharge-chute 38.

When rivets are made by the machine, the feed-roll dies 41 are omitted, causing the rod to be fed in without being partially severed, as when spikes are made, and the gripping-dies are made with gripping-faces hollowed to fit the rod and not arranged at an angle as the spike-dies, (see Fig. 14,) and the ram-tool 23 is cupped to correspond with the shape of the rivet-head desired, in which instance the action of the feed, the gripping-dies, the ram, and the shedder are substantially the same as when a spike is made. Bolt-blanks may also be made in like manner, and in each instance the rods from which the spikes, rivets, or bolts are made are fed into the machine while hot, so they may be more easily formed, as described.

Above cylinder 2 is a steam-chest 5, having fitted into its bore a cylinder 66. (See Figs. 3 and 4.) 67, 68, and 69 are annular steam-chambers having ports opening into said cylinder. Chamber 67 is connected with steam-pipe 47, which is the steam-supply pipe, and consequently chamber 67 is constantly supplied with live steam, and chamber 68 is connected with pipe 48, which is an exhaust-pipe. A port 49 leads from chamber 67 into cylinder 2 forward of its piston-head, (see Figs. 3 and 4,) and live steam is likewise constantly supplied to cylinders 3 and 4 forward of their piston-heads 10 and 11 through a main feed-pipe 55 and a tributary thereof 56, (see Figs. 2 and 7,) and therefore each cylinder is supplied with a mild constant steam-pressure forward of its piston-head for the purpose of causing an immediate return movement to each of the operating parts of the machine in their relative order after each forward movement. Steam is supplied to the rear of the cylinders 2, 3, and 4 from the main supply-pipe as follows: A double-headed plunger 44 45 is placed in cylinder 66, the two heads of said plunger being connected by means of a stem or rod, thus forming a chamber 46 between said heads, and when said plunger is in the position shown in Fig. 3 the annular chambers 67 and 69 are open, by means of their ports to cylinder 66 and the chamber 46, to communication with each other, and at such time the live steam will enter annular chamber 69 and by means of a port 53 (see Figs. 3 and 4) conduct the steam from said chamber to the rear of piston-head 9 in cylinder 2, and such position of plunger 44 45 is caused by reason of live steam being conducted from the forward end of cylinder 2 through a port 51 (see Figs. 3 and 8) into cylinder 66, causing the plunger to be thrown to the opposite end of its cylinder to the position shown in Fig. 3, and in such instance the piston-head 9 of cylinder 2 is back its full stroke and the condensed steam in the cylinder 66 adjacent to plunger end 44 is exhausted down through a port 50 into cylinder 2 at a point between two packing-rings of piston 9, and from thence exhausts from said cylinder through a bottom exhaust-pipe 52. (See Figs. 3, 4, and 8.) When the pressure of steam conducted through ports 53 to the rear of piston-head 9 has caused said head to make its forward stroke, port 50 will then be exposed and open to take live steam from that supplied into the rear of cylinder 2, and from thence passes into cylinder 66 against plunger end 44 and forces said plunger to the opposite end of cylinder or steam-chest 66 and opposite to the position shown in Fig. 3, and the condensed steam in the steam-chest 66, adjacent plunger end 45, will then exhaust down through port 51 into cylinder 2, and the position of piston-head 9 will then be such as to take said exhaust between two of its packing-rings and conduct it down to the exhaust-pipe 52. When the plunger 44 45 is in such reverse position, the chamber 46 between said plunger ends is located so as to open ports leading from the annular chamber 69 into steam-chest 66 to communication with those leading into annular chamber 68 and thence to the exhaust-pipe 48, and as said port 53 communicates with said annular chamber 69 condensed steam in the rear end of cylinder 2 may then exhaust, and when exhausted the constant live-steam pressure in the forward end of said cylinder (which is momentarily overcome and ejected by the pressure at the rear of the piston-head 9, due to less surface contact against the piston-head) will immediately force the said piston-head back in the rear portion of cylinder 2, and thus the alternate action of the piston-head 9 and plunger 44 45 causes alternate action of the steam-pressure and results in the automatic action of the ram and of the lever and pawl-and-ratchet mechanism connected with the ram for intermittently rotating the feed-rolls to feed forward the spike-blanks, which feeding forward is done simultaneously with the rearward movement of the ram. Like action (as described of piston-head 9 by the steam passing through port 53) is given piston-heads 10 and 11 by means of steam passing through port 54, leading from annular chamber 69 of steam-chest 5, (see Figs. 1, 4, 7, and 8,) and is made by a direct connection with the rear portion of cylinder 3 and connected by a tributary with the lower end of cylinder 4. Therefore all the pistons are governed in their movement by the action of plunger 44 45 in steam-chest 5, and by reason of a reduction in size of the steam-port 53 at its junction with cylinder 2 the steam is supplied slightly slower to said cylinder than to cylinder 3, resulting in the action of die 15 being sufficiently in advance of the action of the ram so a spike is gripped immediately prior to the engagement therewith of the heading-tool of the ram, and in like manner the port 54, communicating with cylinder 4, is sufficiently small so the steam-supply thereto will not overcome the constant live-steam pressure in the upper end of the cylinder until the action of the heading-tool has taken place. The exhaust of condensed steam is made from cylinders 3 and 4 in like manner as is described of cylinder 2.

Compressed air may be used in place of steam-pressure, if desired.

Having thus described our invention, what we claim as new, and desire to secure by Letters Patent, is as follows:

1. In the machine described in combination with rock-shaft 25, the arms 24 and 26 on said shaft, said arms being connected to the piston, the feed-roll mechanism, connecting-rod 27 between arm 26 and the feed-roll mechanism whereby the actuation of said piston intermittently operates said feed-roll mechanism substantially as and for the purpose set forth.

2. In the machine described, in combination with the frame embodying in its construction the cylinders 2 and 3, and having attached thereto the cylinder 4; the pistons and their heads operating in said cylinders, and the feeding gripping and shedding mechanism connected with and actuated by said pistons, said mechanism being adapted to be operated by steam or compressed-air pressure, all arranged to operate substantially as and for the purpose set forth.

3. In the machine described in combination with the piston 6 and head 22 thereof, the arms 24, the shaft 25, arms 26, connecting-rod 27, the pawl-and-ratchet mechanism, and the connected feed-rolls having the radially-arranged pinching-dies all arranged to operate substantially as and for the purpose set forth.

4. In the machine described the combination of the die-connecting bar 14 having a transverse recess on its under side near its forward end, the die 15 having a transverse rib or projection 59 on its upper side near its rear end for fitting the groove or recess in said connecting-bar, the wedge-bar 16 for passing under die 15 and holding it connected with bar 14, and the stationary die 13, said dies being provided respectively with the cutting edges 57, 58 and nail-point formers 60, 61, all arranged to operate substantially as and for the purpose set forth.

JOHN C. CROMWELL.
OSCAR SUNDT.

Witnesses:
THOS. H. HUTCHINS,
E. A. HUTCHINS.